Figure 1:
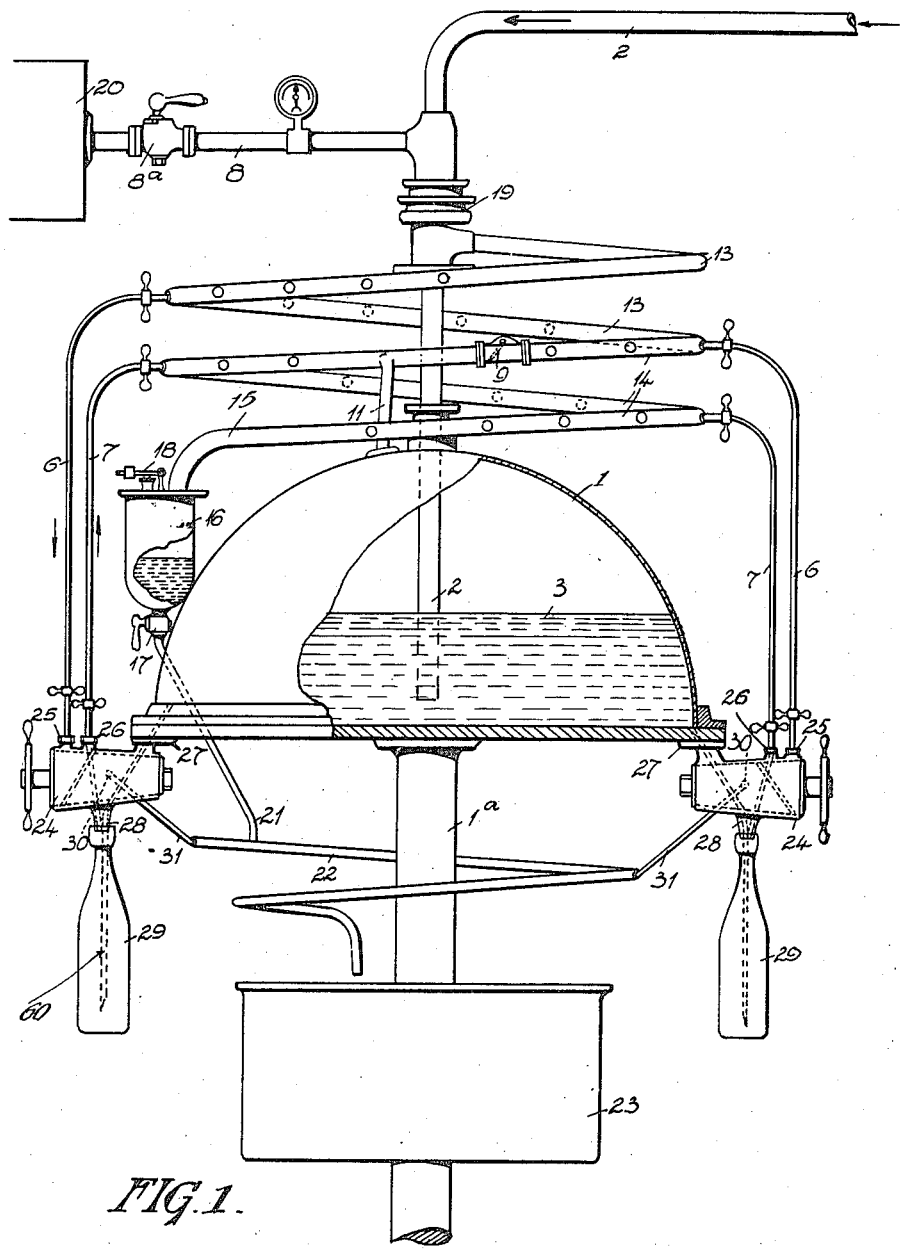

A. CASPARE.
PROCESS OF ISOBAROMETRICALLY FILLING VESSELS AND APPARATUS THEREFOR.
APPLICATION FILED SEPT. 22, 1913.

1,148,574.

Patented Aug. 3, 1915.
4 SHEETS—SHEET 1.

A. CÁSPARÉ.
PROCESS OF ISOBAROMETRICALLY FILLING VESSELS AND APPARATUS THEREFOR.
APPLICATION FILED SEPT. 22, 1913.

1,148,574.

Patented Aug. 3, 1915.
4 SHEETS—SHEET 2.

Witnesses:
R. I. Hulsizer
C. H. Potter

Inventor:
Adolf Cáspare,
by Byrnes, Townsend & Bruckenstein
Attys.

A. CASPARÉ.
PROCESS OF ISOBAROMETRICALLY FILLING VESSELS AND APPARATUS THEREFOR.
APPLICATION FILED SEPT. 22, 1913.

1,148,574.

Patented Aug. 3, 1915.
4 SHEETS—SHEET 3.

Witnesses:
Inventor:
Adolf Caspare
by Byrnes, Townsend & Brickenstein
Attys.

UNITED STATES PATENT OFFICE.

ADOLF CÄSPARÉ, OF ROTTERDAM, NETHERLANDS.

PROCESS OF ISOBAROMETRICALLY FILLING VESSELS AND APPARATUS THEREFOR.

1,148,574.     Specification of Letters Patent.     Patented Aug. 3, 1915.

Application filed September 22, 1913. Serial No. 791,115.

*To all whom it may concern:*

Be it known that I, ADOLF CÄSPARÉ, a subject of the German Emperor, and residing at Rotterdam, Netherlands, have invented a certain new and useful Improved Process of Isobarometrically Filling Vessels and Apparatus Therefor, of which the following is a specification.

My invention relates to an improvement in process and apparatus for filling beer-barrels or bottles which enables the entire apparatus to be maintained perfectly free from germs.

The disadvantages of bottling-apparatus and barrel-fillers customary heretofore consist in the residual air or gas from the previous filling being returned with the residues of beer and foam into the apparatus when filling the next bottles or barrels. In so far as the residual air or gas is not used for establishing the counter-pressure in the next barrels or bottles to be filled, it can escape from the beer tank through an exhaust valve. The foam and residue of beer, however, remain in the tank and mix with the fresh beer. They infect the entire filling apparatus more or less according to the degree of purity of the bottles or barrels.

With a view to obviating the latter defect there has heretofore been employed an open dish floating or fixed in the beer tank, the foam and beer being injected into this dish and the mixture being then drawn off from time to time. This arrangement, however, is not free from objection because foam cannot be readily drawn off and the surface of the beer is constantly agitated by the impure air subjected to considerable motion in the beer tank.

A primary object of my invention is to obviate the drawbacks due to this infection and agitation. To this end, I expel the beer, foam and the residual air or gas from the filling apparatus by the entering fresh gas in the manner which will now be described.

For filling a bottle or barrel I employ three pipes, of which the one supplies the beer, the second supplies the fresh air or gas and the third is used for removing the residual air, the foam and the residues of beer.

The essence of my invention consists in conducting the residual air and whatever foam it may carry from the bottle or barrel to be filled into the air supply-pipe and removing them by a current of air to a receiver. This receiver is preferably arranged outside the tank and can therefore be thoroughly cleaned at any time.

The various pipes leading to the vessel to be filled are controlled by a multiple-way cock of special design which is used for relieving the filled vessel of excess pressure and for completely removing the residual air, so that it is impossible for the fresh beer to be infected.

Figure 6:
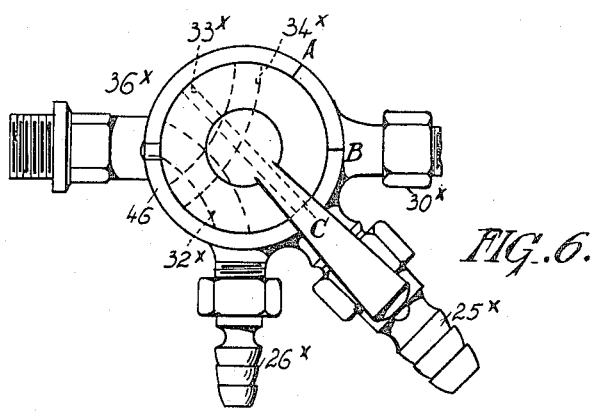
Figure 2:
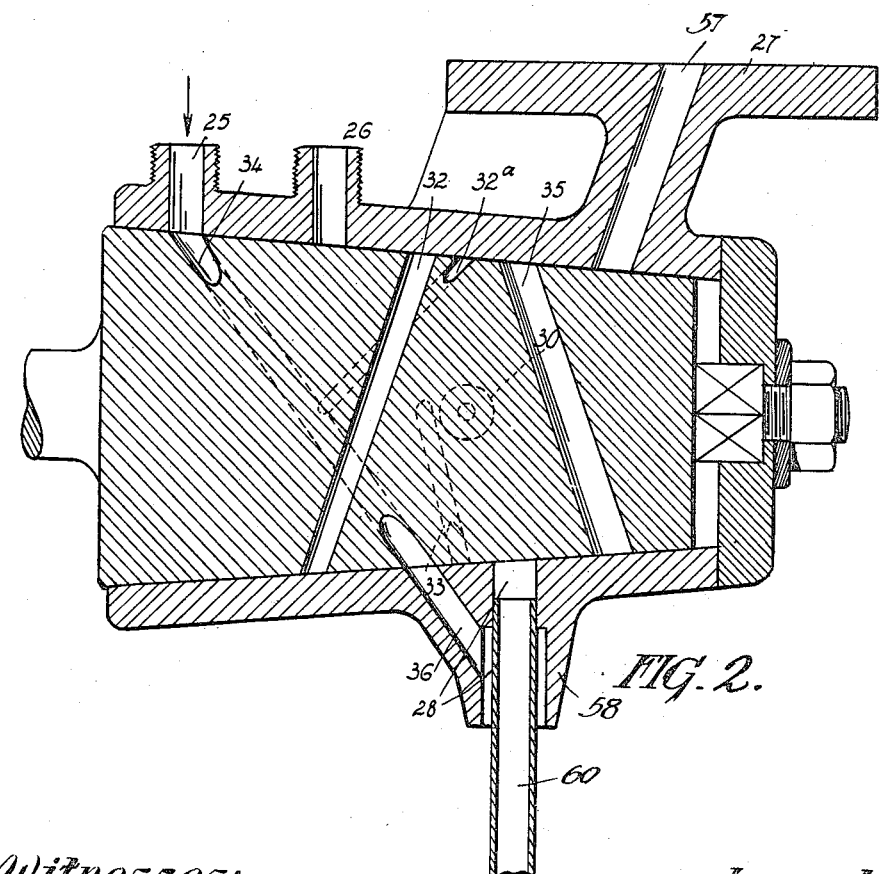
Figure 3:
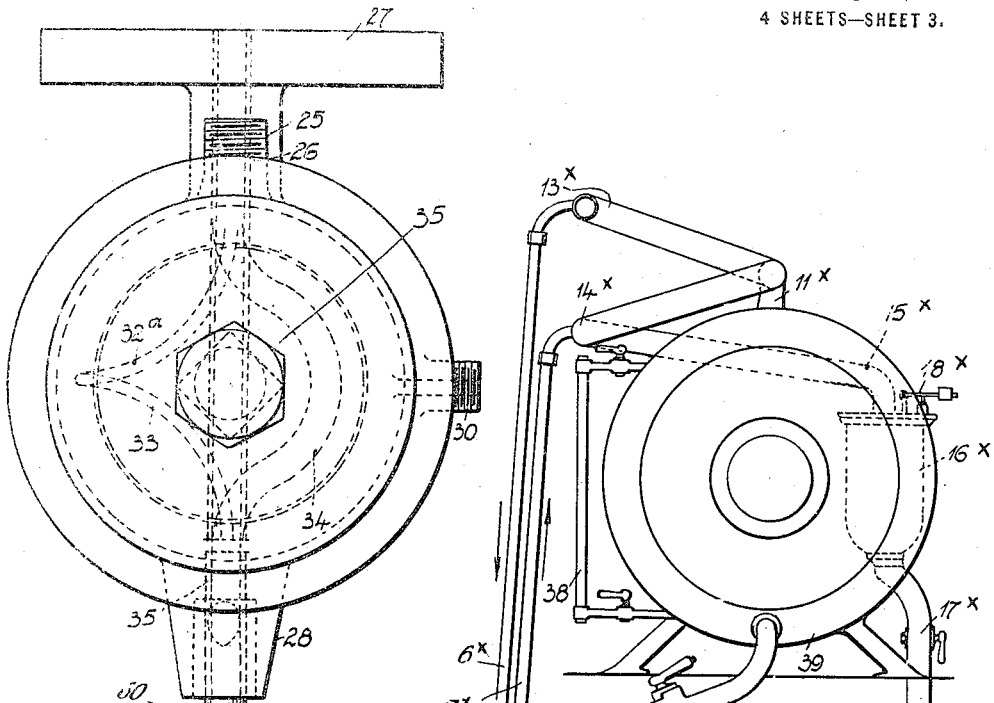
Figure 4:
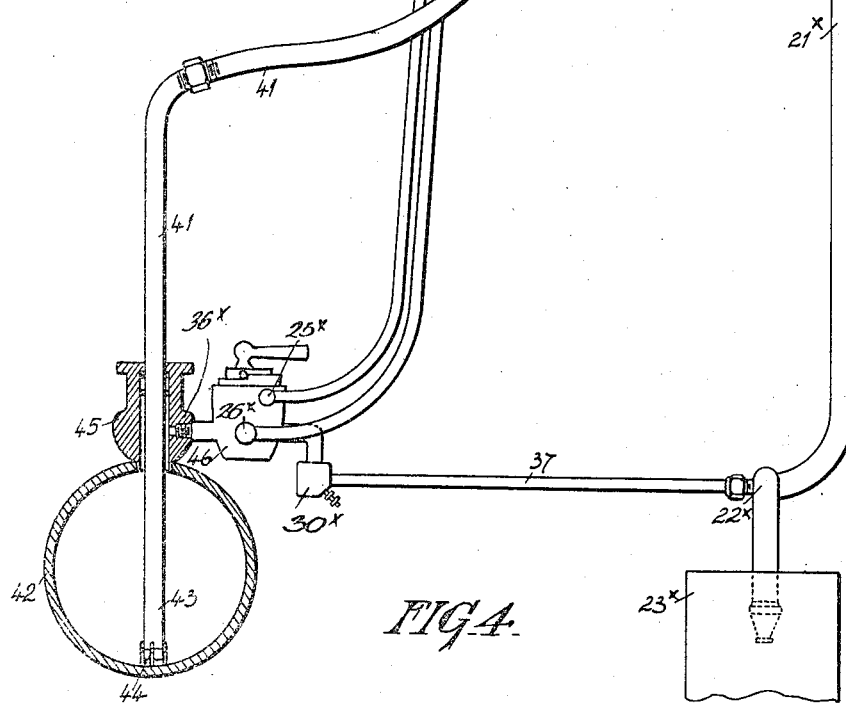
Figure 5:
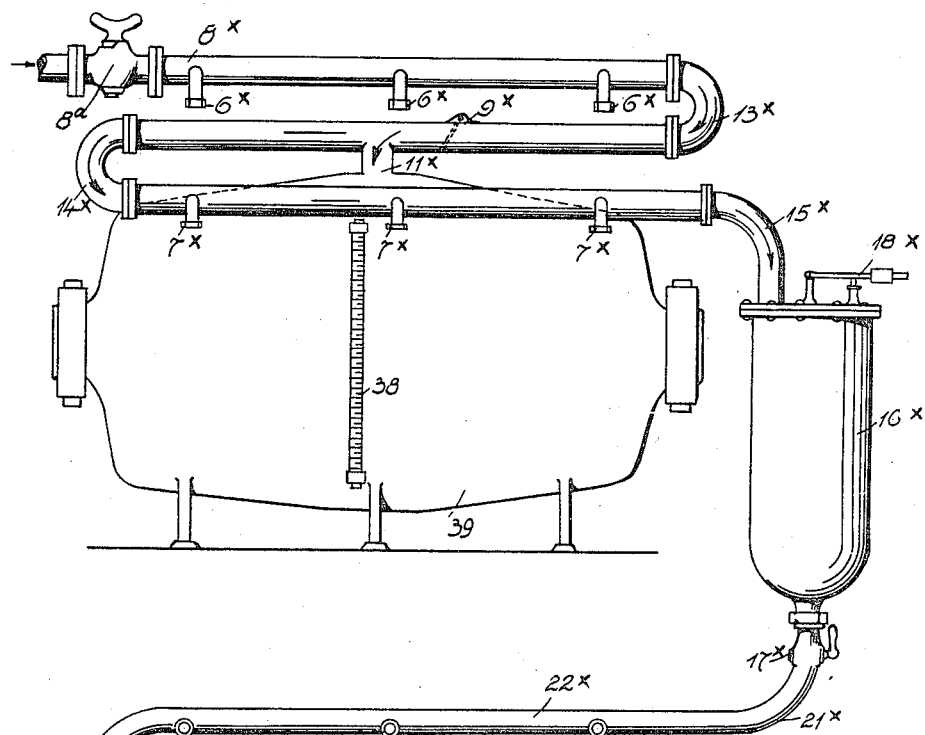

Various forms of apparatus for carrying my improved process into practice are represented by way of example in the accompanying drawings, wherein:

Figure 1 is an elevation of the bottling apparatus, parts being shown broken away; Figs. 2 and 3 are vertical section and end elevation, respectively, showing the form of multiple-way cock employed with the bottling-apparatus; Fig. 4 is an end elevation showing the application of the invention to apparatus for filling barrels; Fig. 5 is a side elevation of the latter apparatus, and Fig. 6 is an elevation of the multiple-way cock used with the latter apparatus.

Referring first to Fig. 1, the bottling-apparatus shown is of the type in which the bottles are automatically filled during the rotation of the entire apparatus; the apparatus comprises a rotatable beer tank 1 which is filled with beer 3 through a pipe 2. The beer tank 1 is directly carried by a shaft 1ᵃ which rests in a suitable bearing and is rotated by any suitable means. In order that the lower part of this pipe 2 may rotate relatively to the upper part a stuffing-box 19 is provided. The gas, air or the like used for bottling is taken from a vessel 20 and flows through the pipe 8 and a branch of the stuffing-box 19 by way of the worm 13, 14 into the receiver 16. The liquid which collects in the receiver 16 can be let off through a pipe 21 and the drain pipe 22 described hereinafter to the tank 23. The pipe 6 for supplying fresh gas and the residual gas pipe 7 branch off from the pipes 13 and 14 and each pair is connected to the openings 25 and 26 of a multiple-way cock 24. The multiple-way cocks are attached by flanged branches 27 to the tank 1, each branch having an opening 57, therethrough. Besides the openings 25, 26, 57, the casing of each multiple-way cock has an opening 28 for connection through faucet 58 to a bottle 29 and an outlet 30 which is connected for the purpose described hereinafter by a pipe 31 to the drain pipe 22. 60 is a pipe connected to opening 28 and extending into the bottle.

The arrangement of the ways or ducts in the multiple-way cock 24 will now be described with reference to Figs. 2 and 3.

The cock has five ducts 32, 32ª, 33, 34 and 35. The last is for connecting the openings 27 and 28. The various positions of the cock are automatically occasioned during the rotation of the bottling-apparatus and bring about the following cycle of operations. Fresh gas flows from the upper part 13 of the worm through the pipe 6, opening 25 and the duct 34 into the gas duct 36 of the cock and thence into the bottle 29 to be filled in order to produce in the latter the counter-pressure requisite for filling the same. At this moment all the other ducts of the cock are closed. When the bottling-apparatus rotates, the cock is rotated clockwise in its housing as seen in Fig. 5 a quarter revolution, i. e. ninety degrees, by suitably arranged fixed stops or the like. Consequently after a quarter revolution the openings 26 and 30 are connected with one another by way of the duct 32ª for completely emptying the pipe 7. During this time the bottle is subjected to a testing pressure which guarantees that the bottle is able to stand the filling which then takes place. After another quarter revolution the duct 35 allows the liquid to flow through the opening 57, the duct 35 and pipe 60 into the bottle 29 and the duct 32 allows the gas used to obtain counter-pressure in the bottle to flow from the duct 36 to the opening 26 from which it passes into pipe 7. In this position the bottle is filled and the liquid rises in the vertical pipe 7 to the height of the liquid-level in the tank 1. As soon as the bottle is filled the cock is automatically turned another quarter revolution. The gas-duct 36 and the opening 30 are then connected by the duct 33, so that the pressure above atmospheric in the bottle is transmitted into the slanting pipe 31 permitting the removal of the bottle. When the cock is in its next position the opening 25 is again connected by the duct 34 with the duct 36, so that fresh gas can flow into the next bottle to be filled.

The bottling-apparatus is used as follows: As soon as the pipe 8 is opened by means of the cock 8ª gas or air flows through the elbow 11 at the previously adjusted pressure, preferably 0.5 atmosphere above atmospheric, into the tank 1 until the same pressure exists therein as in the pipe 8. Simultaneously, air flows through the worm 13, 14 into the receiver 16 and escapes at a predetermined pressure through the exhaust valve 18. The cock 8ª is opened only so far that a moderately strong continuous current of gas or air flows into the worm and so that too much compressed gas is not unnecessarily lost. This requirement is of importance particularly when carbonic acid gas is employed instead of air in filling bottles or other vessels. The beer is now let into the tank through pipe 2 until it has reached a predetermined height, the level of the liquid being kept as uniform as possible by a float, not shown. The tank itself is preferably filled only half full as when it is too full there is a danger of the fresh beer flowing through the pipe 11 and the pipe 13, 14, 15 into the receiver 16. The beer is prevented from rising in the coil 13 by the check valve 9. The gas ejected from the bottles drives the air and beer in the pipe 7 into the lower coil 14 and flows through the pipe 15 to the receiver 16, from which the gas escapes into the open air through the exhaust valve 18, while the beer and foam collect in the receiver 16. The current of gas constantly flowing through the coils 13 and 14 maintains this movement and prevents the residual gas rising into the coil 13. Consequently, while the main current of gas maintains sufficient pressure in the pipes, which can be readily ascertained by attaching a manometer, it is impossible for residual gas to mix with the fresh beer owing to the column of flowing gas between the mouths of the pipes 6 and 7. The receiver 16 is emptied from time to time by opening the blow-off cock 17.

Besides the advantage resulting from all possibility of infection being obviated, my improved bottling-apparatus has the additional advantage that the beer in the tank 1 is hardly agitated at all, as gas enters into or issues from the tank through the pipe 11 only when the pressure in the tank changes to a considerable degree. When beer is supplied to the tank as fast as the bottles are filled, this pressure does not change. In addition, a layer of carbonic acid rapidly forms on the beer surface, so that there is only little movement in the cushion of gas lying almost perfectly still over the beer.

My invention can also be employed in barrel-fillers in a similar manner as in bottling-apparatus. Figs. 4 and 5 show a preferred form of such an apparatus for filling barrels or casks. The fresh beer from the tank 39 (provided with a sight-gage 38) flows through a pipe 41, having a cock 40, to the beer-barrel 42. The lower part of this pipe consists of a rigid metal pipe 43 provided with a valve 44 at its end in the barrel. This pipe 43 is arranged axially displaceable in the filling head 45. Connected to this head 45 by way of the branch 36ˣ is a multiple-way cock 46 which works in the manner described hereinafter similar to the multiple-way cock 24. In this embodiment, pipes 6ˣ and 7ˣ connect the barrel 42 with the air pipe 8ˣ which can be closed by a cock 8ᵃ similar to cock 8ᵃ in Figs. 1 and 3. The air pipe 8ˣ comprises two coils 13ˣ and 14ˣ connected to the receiver 16ˣ by the elbow 15ˣ, and the residual air pipes 7ˣ are connected to the lower coil 14ˣ. The receiver 16ˣ is provided with an exhaust valve 18ˣ and its bottom with a cock 17ˣ which conducts the beer foam through the pipes 21ˣ and 22ˣ to the tank 23ˣ. A pipe 37 connected to the cock 46 also opens into this tank.

The fresh gases and beer are protected from infection by the residual gases and by the beer and foam remaining in the pipes in the same manner as in the above described bottling-apparatus, as the current of fresh gas constantly flowing through the pipes 8ˣ, 13ˣ, 14ˣ drives off the residues to the receiver 16ˣ without their coming into contact with the fresh gas or beer to be used for filling the next barrel. The pressure of gas or air on the fresh beer is produced by way of the pipe 11ˣ in the same manner as in the above described bottling-apparatus. Here also the multiple-way cock 46 worked by hand is used in approximately the same manner as the multiple-way cock 24.

The cock 46 has three ducts 32ˣ, 33ˣ, 34ˣ, but not the duct 32ᵃ of the cock 24, as this duct is not necessary in the barrel-filler because the testing pressure for bottles is not wanted for barrels. The duct 35 of the cock 24 is also lacking, but is substituted by the above mentioned filling pipe 43 generally used in filling barrels. It is opened at the proper moment by, for example, pushing its end on the bottom of the barrel 42 and thereby actuating the valve 44.

The barrel-filling apparatus operates as follows:—In the position of the cock 46 shown in Fig. 8 the branches 26ˣ and 36ˣ are connected by the duct 32ˣ, while the branches 25ˣ and 30ˣ are completely closed by the spigot. In this position the filling gas is ejected by the entering beer into the pipe 7ˣ and the worm 14ˣ and removed thence as described above. When the cock is turned 45° so that its handle is located at B, the duct 33ˣ connects the branches 30ˣ and 36ˣ for relieving the barrel from the excess pressure above atmospheric, while the ducts 32ˣ and 34ˣ are now closed. In order finally to connect the branch 25ˣ with the branch 36ˣ and to be able to conduct the fresh gas for producing the counter-pressure into the next barrel to be filled, the cock is turned 45° farther into the position A. The duct 34ˣ now connects the branches 25ˣ and 36ˣ. At the same time, however, the duct 32ˣ opens the mouths of the branches 26ˣ and 30ˣ for completely emptying the pipe 7ˣ. Obviously, when filling the barrel, the cock is turned in the reverse direction, i. e. clockwise, from the position A over B to C and then back to A.

The described mode of supplying air or gas and the employment of the multiple-way cock enables the barrel to be filled under a counter-pressure without the rejected beer or gas being able to return into the supply tank. Also, the danger of infection of one vessel by another is reduced to a minimum. Further, the beer is not agitated.

Another advantage of my invention as compared with known bottling or barreling apparatus is that owing to the residual gas pipe being emptied each time downward, the capacity of the bottling or barreling apparatus is materially increased as the issuing gas meets with no resistance in the residual gas pipe.

I claim:—

1. A vessel-filling machine, comprising a tank for liquid, a vessel-filling faucet, a conduit for compressed gas, a branch pipe from said conduit to the tank, a pressure-equalizing pipe leading from the conduit to said faucet, a delivery pipe leading from the tank to said faucet, a valve having passages for simultaneously connecting said delivery pipe and said pressure-equalizing pipe to said faucet, whereby the vessel may be filled, said conduit extending downwardly from the point at which said pressure-equalizing pipe is connected, and means at the end of said conduit for permitting escape of gas into the open air.

2. A vessel-filling machine, comprising a tank for liquid, a vessel-filling faucet, a conduit for compressed gas, a branch pipe from said conduit to the tank, a pressure-equalizing pipe leading from the conduit to said faucet, a delivery pipe leading from the tank to said faucet, a discharge pipe for excess liquid, a valve having passages for simultaneously connecting said delivery pipe and said pressure-equalizing pipe to said faucet, and also a passage for subsequently connecting said pressure-equalizing pipe and said discharge pipe, said conduit extending downwardly from the point at which said pressure-equalizing pipe is connected, and means at the end of said conduit for permitting escape of gas into the open air.

3. A vessel-filling machine, comprising a tank for liquid and means for delivering liquid to the lower portion thereof, a vessel-filling faucet, a conduit for compressed gas, a branch pipe from said conduit to the upper part of the tank, a pressure-equalizing pipe leading from the conduit to said faucet, a delivery pipe leading from the tank to said faucet, a valve having passages for simultaneously connecting said delivery pipe and said pressure-equalizing pipe to said faucet whereby the vessel may be filled, said conduit extending downwardly from the point at which said pressure-equalizing pipe is connected, and means at the end of said conduit for permitting escape of gas into the open air.

4. A vessel-filling machine, comprising a tank for liquid and means for delivering liquid to the lower portion thereof, a vessel-filling faucet, a conduit for compressed gas, a duct to supply gas to the vessel to be filled, a branch pipe from said conduit to the upper part of the tank, a pressure-equalizing pipe leading from the conduit to said faucet, a delivery pipe leading from the tank to said faucet, a discharge pipe for excess liquid, a valve having passages for simultaneously connecting said delivery pipe and said pressure-equalizing pipe to said faucet, and also a passage for subsequently connecting said pressure-equalizing pipe and said discharge pipe, said conduit extending downwardly from the point at which said pressure-equalizing pipe is connected, and means at the end of said conduit for permitting escape of gas into the open air.

5. A vessel-filling machine, comprising a tank, a source of compressed gas, a conduit connected thereto, a vessel-filling faucet below the tank, a pressure pipe leading from said conduit to said faucet, a branch pipe leading from the conduit to the tank, a pressure-equalizing pipe connected to the conduit at a point beyond said branch pipe and leading to said faucet, said conduit slanting downwardly from said point, an escape valve to the open air at the end of said conduit, a discharge pipe leading downwardly from said faucet, a delivery pipe from the tank to the faucet, and a valve having passages for first connecting the pressure pipe to the faucet for secondly connecting the delivery pipe and equalizing pipe to the faucet and for subsequently connecting the equalizing pipe to the discharge pipe.

6. A vessel-filling machine, comprising a tank, vessel-filling means located below said tank, a source of compressed gas, a conduit for the compressed gas, a delivery pipe from the tank to said vessel-filling means, a branch pipe from said conduit to said tank and an equalizing pipe from said conduit to said filling means, and means for discharging excess liquid from said equalizing pipe to a point outside said tank whereby such excess liquid is prevented from returning to the system.

7. A vessel-filling machine, comprising a tank, vessel-filling means located below said tank, a source of compressed gas, a conduit for the compressed gas, a delivery pipe from the tank to said filling-means, a branch pipe from said conduit to said tank, an equalizing pipe and a pressure pipe from said conduit to said filling means, and means for discharging excess liquid and gas expelled from the vessel being filled from said equalizing pipe to points outside said tank whereby said excess liquid and gas are prevented from returning to the system.

8. The art of filling vessels with liquids, under counter pressure, from a tank, which consists in maintaining a continuous current of gas, permitting the liquid while under pressure derived from said current to flow from the tank into and fill the vessel against an equal pressure also derived from said current through an equalizing pipe, and permitting the air and excess liquid expelled from the vessel to flow into said equalizing pipe but without permitting them to enter said tank, and blowing off the excess liquid from the equalizing pipe, into a separate receptacle after the vessel has been filled.

9. The art of filling vessels against counter pressure, which consists in supplying pressure gas to the liquid-containing tank and to the vessel from a continuously flowing stream, filling the vessel with liquid, and discharging the air expelled from the vessel during the filling into the stream at a point beyond that of pressure supply so that such air can not reënter the system.

10. The art of filling vessels with liquid, which consists in filling the vessel with fresh gas and maintaining a gas-pressure therein, filling the vessel with liquid under substantially the same gas-pressure, flushing the foam and residual gas into an equalizing pipe against counter gas-pressure, arresting the flow of liquid, establishing atmospheric pressure upon the liquid in the filled vessel, and flushing the foam from the equalizing pipe into a separate receiver by the gas-pressure.

11. The method of filling vessels with liquid, which consists in maintaining a substantially quiescent body of gas under pressure above the liquid supply, passing gas under substantially the same pressure into the vessel to be filled, displacing said gas by the liquid under pressure, and passing the gas and foam from the vessel being filled into an equalizing pipe against counter-pressure, collecting said gas and foam separately from said liquid supply under pressure, establishing atmospheric pressure upon the liquid in the filled vessel, and flushing the equalizing pipe with compressed gas in a direction opposite to the admission of the foam.

12. The method of filling vessels with liquid, which consists in maintaining a supply of liquid under a substantially quiescent gas-pressure, supplying a vessel to be filled with gas at substantially the same pressure, displacing said gas in the vessel by the liquid, and admitting the foam and the displaced gas into a separate receiver against a counter-pressure substantally equal to the pressure above said supply of liquid, said foam and displaced gas being maintained out of contact with the gas above said supply of liquid, and flushing the separate receiver with compressed gas in a direction opposite to the admission of the foam and gas.

In testimony whereof, I affix my signature in the presence of two witnesses.

ADOLF CÄSPARÉ.

Witnesses:
J. A. WHEELER,
Y. W. FAFIÉ.